No. 693,486. Patented Feb. 18, 1902.
R. BALDRIDGE.
RIDGE BREAKER.
(Application filed May 1, 1901.)
(No Model.)

WITNESSES
Chas. L. Hyde.
Mattie McGinnis

INVENTOR
Robert Baldridge
BY HIS ATTORNEYS
Hazard & Harpham

UNITED STATES PATENT OFFICE.

ROBERT BALDRIDGE, OF COVINA, CALIFORNIA.

RIDGE-BREAKER.

SPECIFICATION forming part of Letters Patent No. 693,486, dated February 18, 1902.

Application filed May 1, 1901. Serial No. 58,385. (No model.)

*To all whom it may concern:*

Be it known that I, ROBERT BALDRIDGE, a citizen of the United States, residing at Covina, in the county of Los Angeles and State of California, have invented new and useful Improvements in Devices to Remove the Ridges Made on Ground which has been Prepared for Irrigation, of which the following is a specification.
These ridges are made to hold the water, so that it may soak into the soil, after which and when the ground has become sufficiently dry to become cultivated these ridges have to be removed, so that the ground can be cultivated; and the object of my invention is to provide a device by means of which the removal of these ridges is easily, quickly, and economically effected.

My device is shown in the accompanying drawings, in which—

Figure 1:
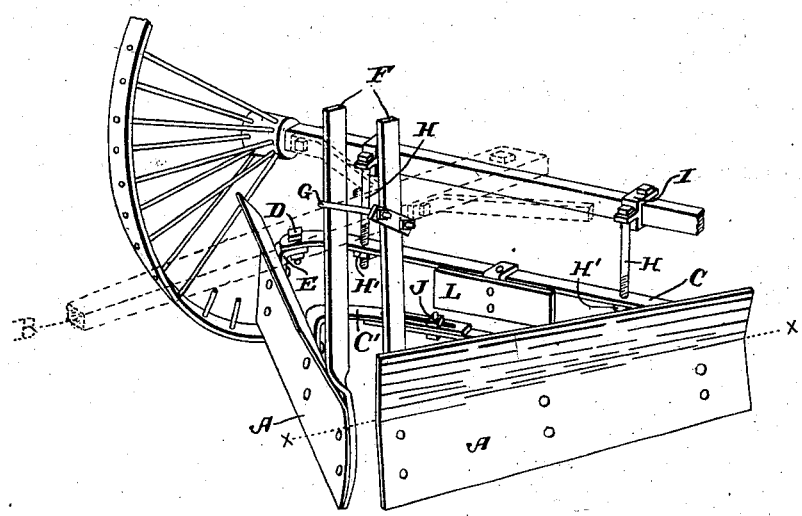
Figure 2:
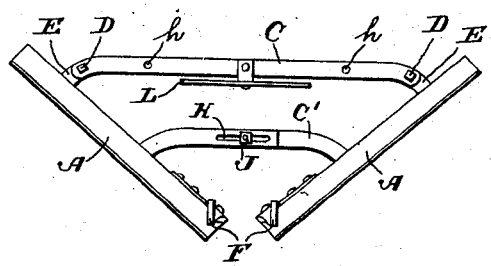

Figure 1 is a perspective view of my device secured to appropriate running-gear, a fragment only of the wheel and axle being shown, the tongue being shown in dotted lines. Fig. 2 is a plan view of my device removed from the running-gear.

My ridge-breaker is comprised in two scraper-wings A, arranged to be suspended one on either side of the tongue of any appropriate running-gear, such as the cultivator B, (the tongue shown in dotted lines,) the device being clamped in front to the tongue by the upright supports F, which project upwardly on both sides of the tongue and are securely clamped thereto by means of clevis G, affording means to adjust the device on the level desired, the rear end of the device being supported by the depending bolts H, which pass down through suitable holes in the clip I, secured to the axle of the supporting-wheels, and thence down through holes $h$ in the hind brace C, and are adjustable as to elevation by means of the nuts H' on the lower ends of the depending bolts.
The hind brace C is pivotally secured at each end to lugs E, riveted to the inside of the scraper-wings by bolts D, the front brace C' being composed of two members, each of which is rigidly secured by rivets to the inside of the scraper-wings, one lying above the other, and clamped together in the center by the bolt J, which passes through both of them, a longitudinal slot K being provided in the upper member of the brace C' to permit of the proper angular adjustment of the scraper-wings. Rigidly secured to the rear brace C is the central vertical scraper L.

The ridge-breaker being secured to a cultivator or other appropriate running-gear and being properly adjusted, as shown in Fig. 1, it is moved along over the ridge to be leveled, the cultivator straddling the same. The scraper-wings will remove all but the central part, leaving this part of the work to be performed by the central vertical scraper. The bottom of this scraper is adjusted above the elevation of the bottom of the scraper-wings and as it moves along will throw that projection of the ridge left in the middle which is above the bottom of the vertical scraper into the rear of the scraper-wings and partially fill up the depressions made by the wings. These scrapers, if properly adjusted, I have found will level off the ground in very satisfactory manner. By leaving an opening between the scraper-wings, I have found that grass and weeds will not clog the machine, but that the grass and weeds will pass on the outside of the wings or between them and do not clog. The effect of the central opening between the scraper-wings steadies the device and is to prevent it from running to the right or left, away from its work, as I have found by experience to be the case when there is no opening between the scraper-wings at the forward end. The scraper-wings are bent along the central longitudinal line (marked $x$ $x$ on the drawings) thereof and project outwardly therefrom, both above and below this center line. I have found that this particular configuration of the scraper-wings produces very satisfactory results in leveling the earth composing the ridges when the cultivator is moved along the ridge at the speed of a team of ordinary work-horses.

Having described my invention, what I claim as new, and desire to secure by Letters Patent, is—

1. In a device to remove ridges made for irrigating purposes, the combination with suitable running-gear of two side scrapers provided with upright supports F, adapted to be clamped one on either side of the tongue of the running-gear; means to clamp the upright supports to the tongue; a front brace, composed of two members projecting inwardly from the side scrapers, one member projecting over and along the other member, the upper member being provided with a longitudinal slot K; a hole in the lower member; a screw-threaded bolt in said hole and in said slot; a rear brace pivotally connected at either end to the side scrapers; a central vertical scraper on said rear brace and carried thereby; and supporting-rods extending from the rear brace to connections with the axle of the running-gear, substantially as shown and described.

2. Means to remove ridges made on irrigable ground, comprising three scrapers, adapted to be secured to a cultivator, or other running-gear; two of the scrapers adapted to be clamped to the tongue of the cultivator in advance of the other scraper, one on either side of the tongue, at an angle thereto, and being spaced apart at their forward ends, as shown, the side scrapers having a depression along the longitudinal center thereof, and being adjustable as to angle; a brace extending from one forward scraper to the other; a third scraper vertically mounted upon and carried by said brace.

In witness that I claim the foregoing I have hereunto subscribed my name this 23d day of April, 1901.

ROBERT BALDRIDGE.

Witnesses:
HENRY T. HAZARD,
MATTIE McGINNIS.